United States Patent
Lee (10) Patent No.: US 11,143,941 B2
(45) Date of Patent: Oct. 12, 2021

(54) PROJECTION DEVICE

(71) Applicant: Coretronic Corporation, Hsin-Chu (TW)

(72) Inventor: Hung-Lin Lee, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/882,544

(22) Filed: May 25, 2020

(65) Prior Publication Data
US 2020/0379326 A1 Dec. 3, 2020

Related U.S. Application Data

(60) Provisional application No. 62/853,723, filed on May 29, 2019.

(30) Foreign Application Priority Data

Dec. 9, 2019 (CN) .......................... 201922182138.9

(51) Int. Cl.
*G03B 21/14* (2006.01)
(52) U.S. Cl.
CPC ................................. *G03B 21/145* (2013.01)
(58) Field of Classification Search
CPC .............................. G03B 21/14; G03B 21/145
USPC .......................................................... 353/119
See application file for complete search history.

(56) References Cited

U.S. PATENT DOCUMENTS 7,618,148 B2 * 11/2009 Meng ................... G03B 21/145
353/119

8,313,200 B2 11/2012 Yen et al.
8,752,968 B2 * 6/2014 Saito .................... G03B 21/142
353/100
9,952,487 B2 4/2018 Lin
2007/0206124 A1 9/2007 Lee
2008/0013056 A1 * 1/2008 Tsuboi ................. G03B 21/145
353/119
2011/0001938 A1 * 1/2011 Tsai ..................... G03B 21/145
353/84

(Continued)

FOREIGN PATENT DOCUMENTS

| CN | 1779556 | 5/2006 |
|---|---|---|
| CN | 204437924 | 7/2015 |
| CN | 107856607 | 3/2018 |

OTHER PUBLICATIONS

"Search Report of Europe Counterpart Application", dated Sep. 16, 2020, p. 1-p. 7.

*Primary Examiner* — William C. Dowling
(74) *Attorney, Agent, or Firm* — JCIPRNET (57) ABSTRACT

A projection device including a housing and a display module is provided. The display module is configured in the housing and may include a frame, an optical engine assembly, and at least one first electronic component. The frame may include a first assembling portion and at least one second assembling portion. The optical engine assembly is assembled to the first assembling portion in a first direction. The at least one first electronic component is assembled to the at least one second assembling portion in a second direction different from the first direction. In the projection device provided, interior space may be effectively utilized and the projection device may have advantages in a smaller volume.

16 Claims, 5 Drawing Sheets

(56) References Cited

U.S. PATENT DOCUMENTS

2020/0379325 A1\* 12/2020 Lee .................. B60Q 1/323
2021/0080814 A1\* 3/2021 Hsueh ................ G03B 21/16

\* cited by examiner

PROJECTION DEVICE

CROSS-REFERENCE TO RELATED APPLICATION

This application claims the priority benefit of U.S. Provisional application Ser. No. 62/853,723, filed on May 29, 2019 and China application serial no. 201922182138.9, filed on Dec. 9, 2019. The entirety of the above-mentioned patent application is hereby incorporated by reference herein and made a part of this specification.

BACKGROUND OF THE INVENTION

1. Field of the Invention

The invention relates to a display device, and in particular, to a projection device including a display device.

2. Description of Related Art

A projection device may be used for projecting a picture outside of the projection device. In the projection device, for example, an illumination beam generated by a light source may be converted into an image beam using a light valve, and then the image beam may be projected through a projection lens, such that an image may be formed.

As the projection devices are developed in a trend of being miniaturized, a vehicle-used miniaturized projection device is gradually becoming popular. The vehicle-used miniaturized projection device may be installed in a proper position in a car and may be used to project an image or text, for example, text "welcome" or "good trip". The image or text may be projected onto the car door, the ground, or other proper positions when the car door is opened. The vehicle-used miniaturized projection device may also be used for projecting a dynamic image, for example, a video. Since components used for dynamic images, such as an image driving circuit board, may be needed to be configured in the vehicle-used miniaturized projection device, proper configuration of these components in a limited interior space of the projection device is an important topic in the field.

The information disclosed in this Background section is only for enhancement of understanding of the background of the described technology and therefore it may contain information that does not form the prior art that is already known to persons of ordinary skill in the art. Further, the information disclosed in the Background section does not mean that one or more problems to be resolved by one or more embodiments of the invention were acknowledged by persons of ordinary skill in the art.

SUMMARY OF THE INVENTION

The invention provides a projection device. In the projection device provided, interior space may be effectively utilized and the projection device may have advantages in a smaller volume.

Other objectives and advantages of the invention may be further understood from the technical features disclosed in the invention.

To achieve one or some or all of the above objectives or other objectives, an embodiment of the invention is directed to provide a projection device. The projection device may include a housing and a display module. The display module is configured in the housing and may include a frame, an optical engine assembly, and at least one first electronic component. The frame may include a first assembling portion and at least one second assembling portion. The optical engine assembly is assembled to the first assembling portion in a first direction. The at least one first electronic component is assembled to the at least one second assembling portion in a second direction different from the first direction.

The embodiment of the invention may have at least one of the following advantages or effects. The frame of the display module may include a first assembling portion and a second assembling portion. The first assembling portion is used for the optical engine assembly and the second assembling portion is used for the first electronic component, so that the assembling direction (that is, the second direction) of the first electronic component is different from the assembling direction (that is, the first direction) of the optical engine assembly. Since the display module may not be limited to a single assembling direction, problems of poor space utilization or large volumes caused from excessive components stacked in a single direction may be avoided. In addition, the optical engine assembly and the frame can be integrated into a display module by using the frame, thereby simplifying the manufacturing and maintenance of the projection device.

Other objectives, features and advantages of the invention will be further understood from the further technological features disclosed by the embodiments of the invention where there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
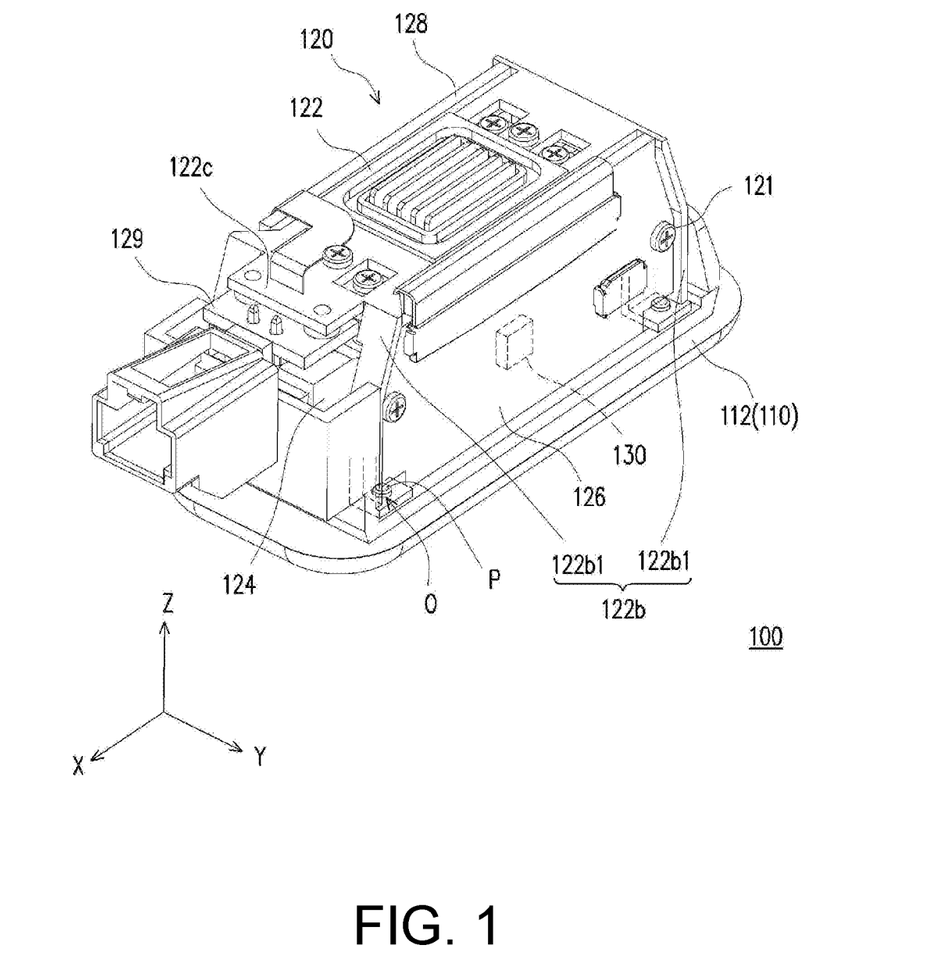
FIG. 1 is a three-dimensional view of some components of a projection device according to an embodiment of the invention.
Figure 2:
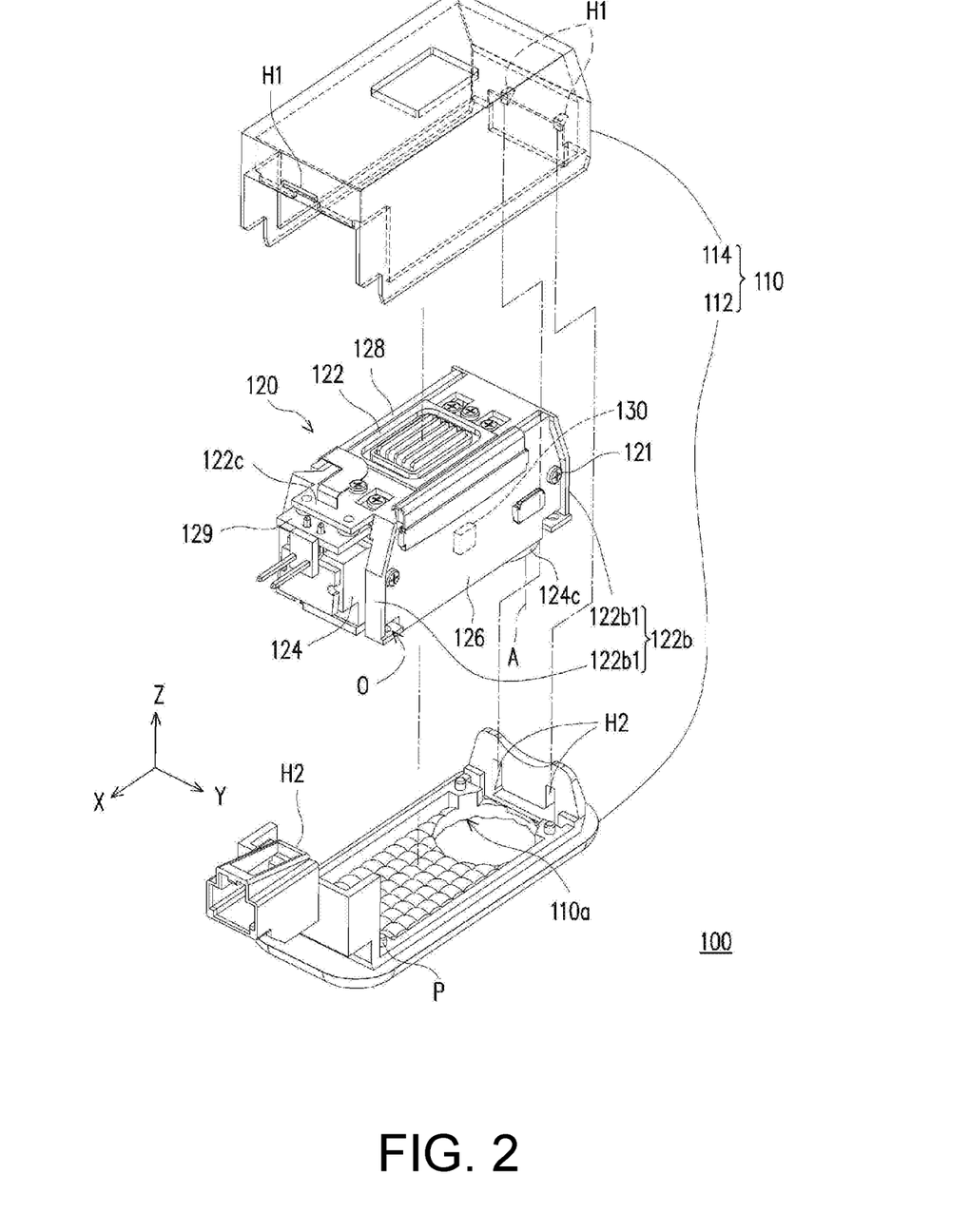
FIG. 2 is an exploded view of the projection device in the embodiment of FIG. 1.

FIG. 1 is a three-dimensional view of some components of a projection device 100 according to an embodiment of the invention. FIG. 2 is an exploded view of the projection device 100 in FIG. 1. For the sake of brevity and clarity, the housing 110 in FIG. 2 may include a first sub-housing 112 and a second sub-housing 114, while the second sub-housing 114 is not shown in FIG. 1. Referring to FIG. 1 and FIG. 2, the projection device 100 in the embodiment may include the housing 110 and a display module 120. The housing 110 may include an opening 110a. The display module 120 is configured in the housing 110 and is configured to project an image through the opening 110a of the housing 110.

Figure 3:
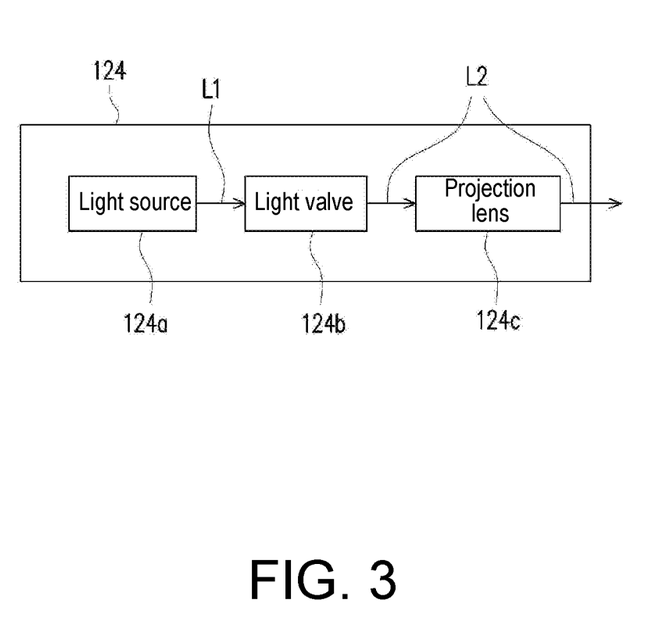
FIG. 3 is a schematic view of an optical engine assembly in the embodiment of FIG. 2.

FIG. 3 is a schematic view of an optical engine assembly 124 in FIG. 2. Referring to FIG. 2 and FIG. 3, the display module 120 in the embodiment may include the optical engine assembly 124 and at least one first electronic component (for example, two first electronic components 126 and 128 shown). For example, the first electronic component 126 is, for example, an image driving circuit board, and the projection device 100 may include a memory 130 configured on the image driving circuit board to store dynamic and/or static image information. The other first electronic component 128 is, for example, a power control circuit board. The power control circuit board may further include a light source driving circuit board. The optical engine assembly 124 may include, for example, a light source 124a, a light valve 124b, and a projection lens 124c. The light source 124a is configured to emit an illumination beam L1. The light valve 124b is configured to convert the illumination beam L1 into an image beam L2 according to the image information stored in the memory 130. The projection lens 124c is configured to project the image beam L2 outside of the projection device 100.

In an embodiment, the image driving circuit board may include an image processor, such as a central processing unit (CPU), a programmable general-purpose or special-purpose microprocessor, a digital signal processor (DSP), a programmable controller, an application specific integrated circuit (ASIC), a programmable logic device (PLD), other similar devices, and various combinations thereof. In other embodiments, the image driving circuit board may include, for example, a graphics processing unit (GPU). The CPU is, for example, an independent processing chip. The memory 130 may include, for example, a random access memory (RAM), a read-only memory (ROM), a flash memory, a similar element, or various combinations thereof.

In some embodiments, for example, the light source 124a may include a solid-state illumination source such as a light emitting diode or a laser diode. In some embodiments, the light valve 124b may include for example a liquid crystal on silicon (LCOS) and a digital micro-mirror device (DMD). In some embodiments, the projection lens 124c may include, for example, one or more lenses of various diopters.

Figure 4:
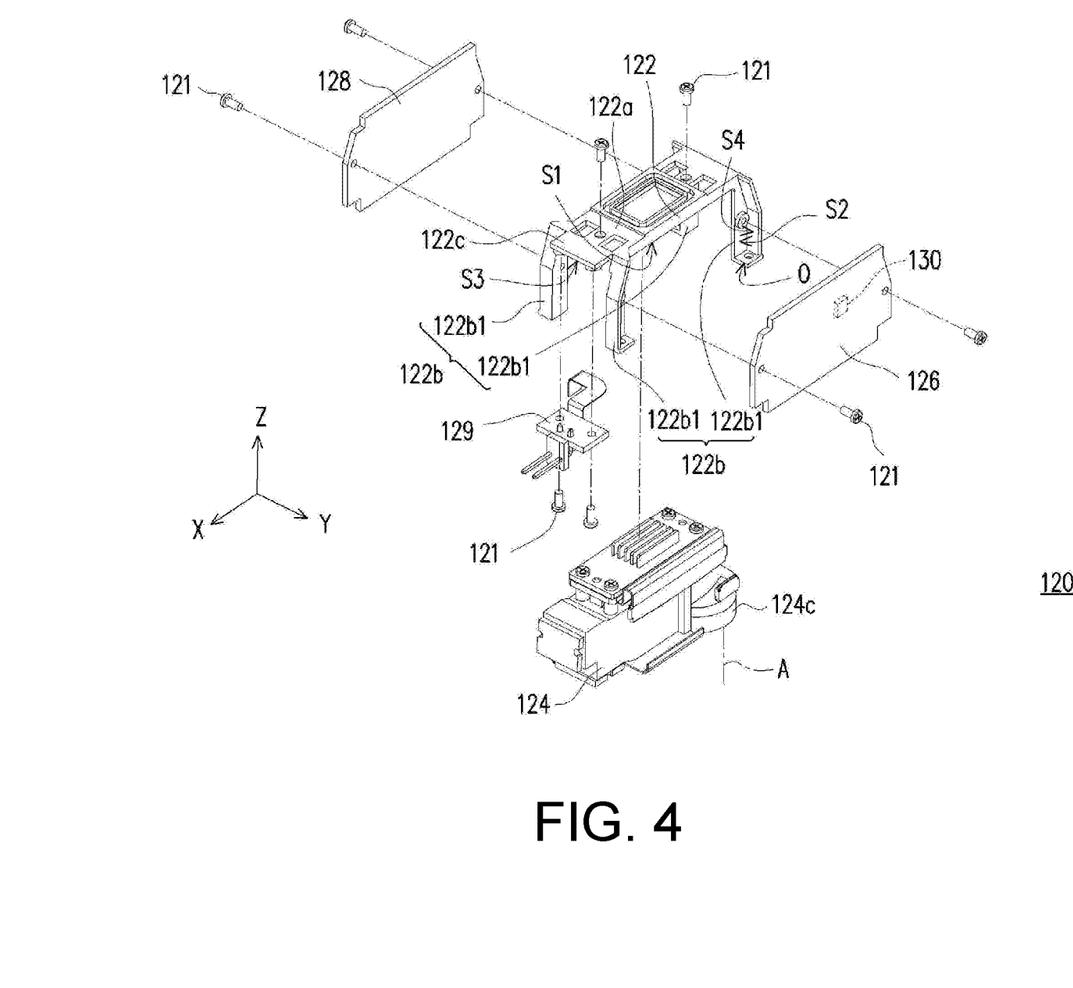
FIG. 4 is an exploded view of a display module in the embodiment of FIG. 2.

FIG. 4 is an exploded view of a display module 120 in FIG. 2. Referring to FIG. 2 and FIG. 4, the display module 120 in the embodiment further may include a frame 122. The frame 122 may include a first assembling portion 122a and at least one second assembling portion 122b (two second assembling portions are shown). The optical engine assembly 124 is assembled to the first assembling portion 122a of the frame 122 in a first direction Z. In some embodiments, the two first electronic components 126 and 128 are assembled to the at least one second assembling portion 122b respectively in a second direction Y and the opposite direction of the second direction Y. The second direction Y is different from the first direction Z. In the embodiment, the two first electronic components 126 and 128 are respectively located on opposite sides of the optical engine assembly 124. In the embodiment, the first direction Z is, for example, parallel to an optical axis A of the projection lens 124c, and the first direction Z is, for example, perpendicular to the second direction Y.

As described above, the frame 122 of the display module 120 in the embodiment may include the first assembling portion 122a and the at least one second assembling portion 122b. The first assembling portion 122a may be used for the optical engine assembly 124 and the second assembling portion 122b may be used for the first electronic components 126 and 128. In this configuration, the assembling direction (that is, the second direction Y) of the at least one first electronic component 126, 128 is different from the assembling direction (that is, the first direction Z) of the optical engine assembly 124, so that the display module 120 may not be limited to a single assembling direction and problems of poor space utilization or large volumes caused from excessive components stacked in a single direction may be avoided. In addition, the optical engine assembly and the frame 122 can be integrated into the display module 120 by using the frame 122, thereby simplifying the manufacturing and maintenance of the projection device 100.

Specifically, in the embodiment, the display module 120 may further include a second electronic component 129. The second electronic component 129 is, for example, a terminal connection board and is configured to be connected with an external power supply. Correspondingly, the frame 122 may further include a third assembling portion 122c, and the second electronic component 129 may be assembled to the third assembling portion 122c in the first direction Z. In an embodiment, the optical engine assembly 124 and the second electronic component 129 may be at least partially stacked on each other in the first direction Z. The optical engine assembly 124 and the two first electronic components 126, 128 are stacked in the second direction Y. In other embodiments, the optical engine assembly 124 may include more electronic components of different types, and the frame 122 may correspondingly include more assembling portions, so that the optical engine assembly 124 and the electronic components may be properly assembled to the frame 122 in different directions.

Referring to FIG. 4, the optical engine assembly 124, the first electronic components 126 and 128, and the second electronic component 129 in the embodiment are respectively assembled to the first assembling portion 122a, the second assembling portion 122b, and the third assembling portion 122c by using a plurality of screws 121. In other embodiments, the optical engine assembly 124, the first electronic components 126 and 128, and the second electronic component 129 may be respectively assembled to the first assembling portion 122a, the second assembling portion 122b, and the third assembling portion 122c in other proper manners such as a fastener. This is not limited in the invention.

More specifically, the first assembling portion 122a in the embodiment may include a first assembling surface S1 (shown in FIG. 4), and the optical engine assembly 124 is assembled on the first assembling surface S1 of the first assembling portion 122a. Each second assembling portion 122b may include a second assembling surface S2 (shown in FIG. 4), and the first electronic components 126 and 128 are respectively assembled on the second assembling surface S2 of the corresponding second assembling portion 122b. The third assembling portion 122c may include a third assembling surface S3 (shown in FIG. 4), and the second electronic component 129 is assembled on the third assembling surface S3 of the third assembling portion 122c. In an embodiment, the third assembling surface S3 of the third assembling portion 122c may be parallel to the first assembling surface S1 of the first assembling portion 122a, and the first assembling surface S1 of the first assembling portion 122a is not parallel to the second assembling surface S2 of the second assembling portion 122b. In this configuration, assembling directions (that is, the first direction Z) of the optical engine assembly 124 and the second electronic component 129 may be identical, and the assembling directions of the optical engine assembly 124 and the second electronic component 129 may not be parallel to the assembling direction (that is, the second direction Y) of the first electronic components 126, 128. In the embodiment, the first assembling surface S1 may be, for example, perpendicular to the second assembling surface S2.

In some embodiments, each second assembling portion 122b may include two extension arms 122b1, and two ends of the first electronic component 126 (or the first electronic component 128) may be respectively assembled on the two extension arms 122b1 of the second assembling portion 122b. A portion (for example, an electronic element on the first electronic component) of the first electronic component 126 (or the first electronic component 128) may be located between the two extending arms 122b1. In other words, the space between the two extension arms 122b1 may be used for accommodating the first electronic component 126 (or the first electronic component 128), so as to further improve the space utilization efficiency in the projection device 100.

In some embodiments, each second assembling portion 122b may include a stopping surface S4 (shown in FIG. 4) on each extension arm 122b1, and the stopping surface S4 may be perpendicular to the second assembling surface S2 and may be configured to stop the corresponding first electronic components 126 and 128, so as to prevent the first electronic components 126 and 128 from an unexpected displacement in a third direction X. The third direction X may be perpendicular to the first direction Z and the second direction Y.

Referring to FIG. 2, the housing 110 in the embodiment may include the first sub-housing 112 and the second sub-housing 114. The display module 120 is fixed between the first sub-housing 112 and the second sub-housing 114. For example, the display module 120 may be fixed on the first sub-housing 112. The image beam L2 generated by the optical engine assembly 124 may be projected through the opening 110a on the first sub-housing 112.

Figure 5:
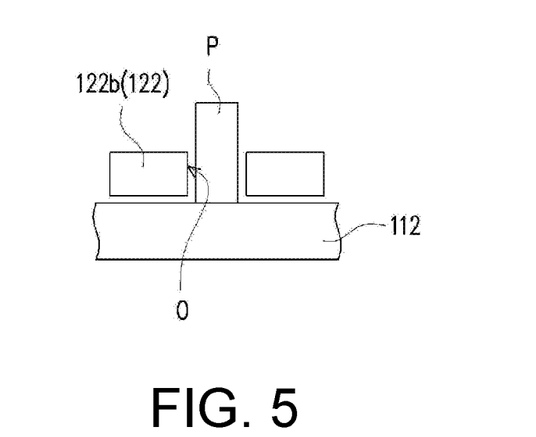
FIG. 5 is a schematic view of matching a cylinder with a round hole in the embodiment of FIG. 2.
Figure 6:
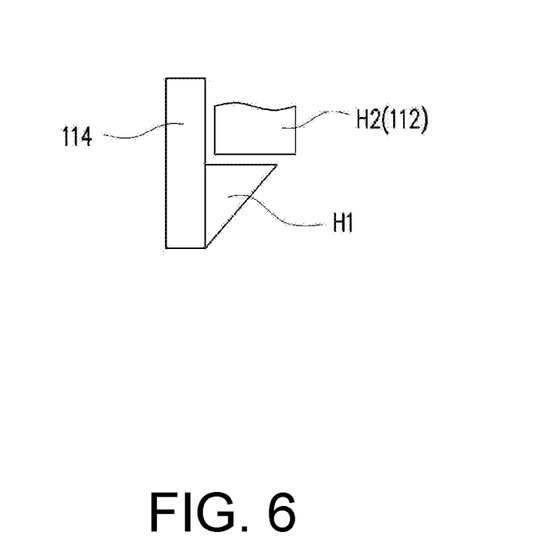
FIG. 6 is a schematic view of fitting a hook with a hook fitting portion in the embodiment of FIG. 2.

FIG. 5 is a schematic view of matching a cylinder with a round hole in the embodiment of FIG. 2. FIG. 6 is a schematic view of fitting a hook with a hook fitting portion in the embodiment of FIG. 2. Referring to FIG. 2, FIG. 5, and FIG. 6, specifically, a plurality of round holes O are disposed on the frame 122 of the display module 120, and a plurality of cylinders P are disposed on the first sub-housing 112. The display module 120 is located on the first sub-housing 112 by matching the round holes O with the cylinders P. In some embodiments, a plurality of hooks H1 may be disposed on the second sub-housing 114, and a plurality of hook fitting portions H2 are disposed on the first sub-housing 112. The hook fitting portions H2 are configured to be fitted with the hooks H1. Specifically, the second sub-housing 114 may be assembled on the first sub-housing 112 in the first direction Z by clamping the hooks H1 to the hook fitting portions H2, such that the display module 120 is fixed between the first sub-housing 112 and the second sub-housing 114. In other embodiments, the display module 120 may be positioned onto the first sub-housing 112 by other proper means. The first sub-housing 112 and the second sub-housing 114 may be assembled together in other proper manners. This is not limited in the invention.

Based on the above, the embodiment of the invention has at least one of the following advantages or effects. The frame of the display module may include a first assembling portion and a second assembling portion. The first assembling portion is used for the optical engine assembly and the second assembling portion is used for the first electronic component, so that the assembling direction (that is, the second direction) of the first electronic component is different from the assembling direction (that is, the first direction) of the optical engine assembly. Since the optical engine assembly and electronic components of the display module may be assembled in different directions, problems of poor space utilization or large volumes caused from excessive components stacked in a single direction may be avoided. In addition, the optical engine assembly and the frame can be integrated into a display module by using the frame, thereby simplifying the manufacturing and maintenance of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection device, comprising a housing and a display module, wherein
 the display module is configured in the housing and comprises a frame, an optical engine assembly, and at least one first electronic component, wherein
  the frame comprises a first assembling portion and at least one second assembling portion;
  the optical engine assembly is assembled to the first assembling portion in a first direction; and
  the at least one first electronic component is assembled to the at least one second assembling portion in a second direction different from the first direction,
 wherein the at least one second assembling portion may include two second assembling portions, the at least one first electronic component may include two first electronic components, and the two first electronic components are respectively assembled on the two second assembling portions and are respectively located on opposite sides of the optical engine assembly.

2. The projection device according to claim 1, wherein the optical engine assembly comprises a projection lens and the first direction is parallel to an optical axis of the projection lens.

3. The projection device according to claim 1, wherein the second direction is perpendicular to the first direction.

4. The projection device according to claim 1, wherein the optical engine assembly and the at least one first electronic component are stacked in the second direction.

5. The projection device according to claim 1, wherein the two first electronic components may include an image driving circuit board and a power control circuit board.

6. A projection device, comprising a housing and a display module, wherein
 the display module is configured in the housing and comprises a frame, an optical engine assembly, and at least one first electronic component, wherein
  the frame comprises a first assembling portion and at least one second assembling portion;
  the optical engine assembly is assembled to the first assembling portion in a first direction; and
  the at least one first electronic component is assembled to the at least one second assembling portion in a second direction different from the first direction,
 wherein the first assembling portion comprises a first assembling surface, the optical engine assembly is assembled on the first assembling surface, the at least one second assembling portion comprises a second assembling surface, the at least one first electronic component is assembled on the second assembling surface, and the first assembling surface is not parallel to the second assembling surface.

7. The projection device according to claim 6, wherein the first assembling surface is perpendicular to the second assembling surface.

8. The projection device according to claim 6, wherein the at least one second assembling portion comprises a stopping surface, and the stopping surface is perpendicular to the second assembling surface and configured to stop the at least one first electronic component.

9. The projection device according to claim 1, wherein the frame comprises a third assembling portion, the display module comprises a second electronic component, and the second electronic component is assembled to the third assembling portion in the first direction.

10. The projection device according to claim 9, wherein the second electronic component is a terminal connection board.

11. The projection device according to claim 9, wherein the optical engine assembly and the second electronic component are at least partially stacked on each other in the first direction.

12. A projection device, comprising a housing and a display module, wherein
 the display module is configured in the housing and comprises a frame, an optical engine assembly, and at least one first electronic component, wherein
  the frame comprises a first assembling portion and at least one second assembling portion;
  the optical engine assembly is assembled to the first assembling portion in a first direction; and
  the at least one first electronic component is assembled to the at least one second assembling portion in a second direction different from the first direction,
 wherein the housing comprises a first sub-housing and a second sub-housing, the display module is located on the first sub-housing, an image beam generated by the optical engine assembly is projected through the first sub-housing, and the second sub-housing is assembled on the first sub-housing in the first direction, such that the display module is fixed between the first sub-housing and the second sub-housing.

13. The projection device according to claim 12, wherein at least one round hole is disposed on one of the display module and the first sub-housing, at least one cylinder is disposed on the other one of the display module and the first sub-housing, and the display module is located on the first sub-housing by matching the at least one round hole with the at least one cylinder.

14. The projection device according to claim 12, wherein at least one hook is disposed on one of the second sub-housing and the first sub-housing, at least one hook fitting portion is disposed on the other one of the second sub-housing and the first sub-housing, the at least one hook fitting portion is configured to be fitted with the at least one hook, and the second sub-housing is assembled on the first sub-housing by fitting the at least one hook with the at least one hook fitting portion.

15. The projection device according to claim 1, wherein the at least one second assembling portion comprises at least two extension arms, two ends of the at least one first electronic component are respectively assembled on the at least two extension arms, and a portion of the at least one first electronic component is located between the at least two extension arms.

16. The projection device according to claim 1, wherein the optical engine assembly and the at least one first electronic component are respectively assembled to the first assembling portion and the at least one second assembling portion by using at least one screw.

* * * * *